US010821548B2

(12) United States Patent
Yamanobe et al.

(10) Patent No.: US 10,821,548 B2
(45) Date of Patent: Nov. 3, 2020

(54) PLATE-MATERIAL ABUTTING DEVICE

(71) Applicant: HONDA MOTOR CO., LTD., Tokyo (JP)

(72) Inventors: Tetsuro Yamanobe, Tochigi (JP); Jun Matsuda, Tochigi (JP); Hiroshi Saito, Tochigi (JP); Yuta Masubuchi, Tochigi (JP); Yuji Iwakami, Ehime (JP)

(73) Assignee: Honda Motor Co., Ltd., Tokyo (JP)

( * ) Notice: Subject to any disclaimer, the term of this patent is extended or adjusted under 35 U.S.C. 154(b) by 487 days.

(21) Appl. No.: 15/557,590

(22) PCT Filed: Sep. 18, 2015

(86) PCT No.: PCT/JP2015/076692
§ 371 (c)(1),
(2) Date: Sep. 12, 2017

(87) PCT Pub. No.: WO2016/151894
PCT Pub. Date: Sep. 29, 2016

(65) Prior Publication Data
US 2018/0056445 A1 Mar. 1, 2018

(30) Foreign Application Priority Data
Mar. 20, 2015 (JP) ................................ 2015-058699

(51) Int. Cl.
B23K 26/10 (2006.01)
B23K 9/025 (2006.01)
(Continued)

(52) U.S. Cl.
CPC .............. B23K 26/10 (2013.01); B23K 9/025 (2013.01); B23K 26/26 (2013.01);
(Continued)

(58) Field of Classification Search
CPC .. B23K 26/10; B23K 9/025; B23K 2101/185; B23K 2101/006; B23K 37/0408
(Continued)

(56) References Cited

U.S. PATENT DOCUMENTS 2,849,592 A * 8/1958 Hawthorne ............ B23K 9/025
219/137 R
3,007,031 A * 10/1961 Cooper .................. B23K 9/025
219/124.4
(Continued)

FOREIGN PATENT DOCUMENTS

CN 103521893 A 1/2014
JP S49-53027 U 5/1974
(Continued)

OTHER PUBLICATIONS

Office Action issued in the corresponding Indian patent application No. 201747036419 dated Jan. 30, 2020.

*Primary Examiner* — Jimmy Chou
(74) *Attorney, Agent, or Firm* — Carrier Blackman & Associates, P.C.; Joseph P. Carrier; William D. Blackman

(57) ABSTRACT

Provided are a plate-material abutting device that easily adjusts a plurality of abutted positions between a plurality of pairs of abutted portions in plate materials, and a plate-material abutting method. The plate-material abutting device is employed for joining a first plate material and a second plate material in a state of being abutted to each other. The first plate material includes a first abutted portion and a second abutted portion that is different from the first abutted portion. The second plate material includes a third abutted portion corresponding to the first abutted portion, and a fourth abutted portion corresponding to the second abutted portion. The plate-material abutting device includes a first abutting mechanism for abutting the first and third abutted portions to each other, and a second abutting mechanism that (Continued)

moves independently from the first abutting mechanism and that abuts the second and fourth abutted portions to each other.

6 Claims, 12 Drawing Sheets

(51) Int. Cl.
 B23K 26/26 (2014.01)
 B23K 37/04 (2006.01)
 B23K 101/00 (2006.01)
 B23K 101/18 (2006.01)
(52) U.S. Cl.
 CPC .... *B23K 37/0408* (2013.01); *B23K 2101/006* (2018.08); *B23K 2101/185* (2018.08)
(58) Field of Classification Search
 USPC ............... 269/20, 32, 43, 152, 155, 156; 219/121.63, 121.64, 121.13, 101, 102; 228/49.4, 49.1, 5.7; 198/400, 463.4
 See application file for complete search history.

(56) References Cited

U.S. PATENT DOCUMENTS

| | | | | |
|---|---|---|---|---|
| 3,582,609 A * | 6/1971 | Morley | ............. | B23K 37/0408 219/161 |
| 3,816,696 A * | 6/1974 | Wheeler | ............. | B23K 9/025 219/124.21 |
| 4,205,214 A * | 5/1980 | Suzuki | ............. | B23K 11/04 219/97 |
| 4,570,049 A * | 2/1986 | Albert | ............. | B23K 9/025 219/124.1 |
| 4,626,651 A * | 12/1986 | Taniguchi | ............. | B23K 26/26 219/121.63 |
| 5,102,492 A * | 4/1992 | Bregolin | ............. | B29C 66/301 156/583.6 |
| 5,123,161 A * | 6/1992 | Kubo | ............. | B62D 65/02 219/79 |
| 5,205,468 A * | 4/1993 | Budenbender | ............. | B23K 26/26 156/304.1 |
| 5,276,304 A * | 1/1994 | Sauvage | ............. | B23K 26/26 219/121.63 |
| 5,305,992 A * | 4/1994 | Kish | ............. | B23Q 1/035 269/228 |
| 5,536,915 A * | 7/1996 | Peru | ............. | B23K 26/26 219/121.63 |
| 5,548,096 A * | 8/1996 | Akasaka | ............. | B23K 37/0443 219/117.1 |
| 5,550,345 A * | 8/1996 | Meier | ............. | B23K 26/26 219/121.63 |
| 5,747,768 A * | 5/1998 | Peru | ............. | B23K 26/0838 219/121.63 |
| 5,910,183 A * | 6/1999 | Ford | ............. | B21D 25/00 72/21.5 |
| 6,339,204 B1 * | 1/2002 | Kato | ............. | B23K 11/3063 219/86.24 |
| 6,491,210 B1 * | 12/2002 | Suzuki | ............. | B23K 11/02 228/170 |
| 6,572,003 B2 * | 6/2003 | Miyata | ............. | B23K 11/061 228/49.1 |
| 6,601,426 B2 * | 8/2003 | Wegener | ............. | B21D 25/02 219/121.63 |
| 6,713,712 B1 * | 3/2004 | Wildmann | ............. | B23K 33/00 219/121.63 |
| 7,377,503 B2 * | 5/2008 | Yajima | ............. | B23K 37/0443 269/152 |
| 7,735,706 B2 * | 6/2010 | Sohl | ............. | B21B 15/0085 228/4.1 |
| 7,748,595 B2 * | 7/2010 | Jin | ............. | B23K 20/24 228/44.3 |
| 7,753,351 B2 * | 7/2010 | Yajima | ............. | B25B 5/122 269/152 |
| 7,784,666 B2 * | 8/2010 | Iimura | ............. | B23K 37/0461 228/49.1 |
| 8,003,914 B2 * | 8/2011 | Nishio | ............. | B23K 37/0408 219/121.63 |
| 8,011,556 B2 * | 9/2011 | Behrens | ............. | B21B 15/0085 228/4.1 |
| 8,800,845 B2 * | 8/2014 | Schulz | ............. | B21C 47/247 228/44.3 |
| 9,931,718 B2 * | 4/2018 | Kaga | ............. | B23K 37/047 |
| 2001/0042774 A1 * | 11/2001 | Miyata | ............. | B23D 15/02 228/171 |
| 2002/0036189 A1 * | 3/2002 | Zennaf | ............. | B23K 26/26 219/121.63 |
| 2002/0100308 A1 * | 8/2002 | Wegener | ............. | B23K 26/10 72/295 |
| 2002/0121506 A1 * | 9/2002 | Menin | ............. | B23K 26/32 219/121.64 |
| 2003/0057191 A1 * | 3/2003 | Wright | ............. | B23K 26/702 219/121.63 |
| 2005/0218576 A1 * | 10/2005 | Yajima | ............. | B23K 37/0443 269/32 |
| 2008/0217307 A1 * | 9/2008 | Dauvel | ............. | B23K 26/22 219/121.64 |
| 2009/0084828 A1 * | 4/2009 | Sohl | ............. | B21B 15/0085 228/44.3 |
| 2009/0159579 A1 * | 6/2009 | Nishio | ............. | B23K 37/0408 219/121.63 |
| 2010/0096793 A1 * | 4/2010 | Falk | ............. | B23K 9/0286 269/287 |
| 2010/0327504 A1 * | 12/2010 | Seidel | ............. | B25B 5/102 269/43 |
| 2011/0220618 A1 * | 9/2011 | Maeno | ............. | B23K 37/0408 219/101 |
| 2011/0240612 A1 * | 10/2011 | Maeno | ............. | B23K 26/0884 219/121.63 |
| 2014/0360991 A1 * | 12/2014 | Steiner | ............. | B29C 66/61 219/121.63 |
| 2015/0115017 A1 * | 4/2015 | Harbaugh | ............. | B23K 37/0443 228/44.3 |
| 2016/0067813 A1 * | 3/2016 | Sakamoto | ............. | B23K 11/115 219/86.7 |
| 2016/0184929 A1 | 6/2016 | Staubli et al. | | |

FOREIGN PATENT DOCUMENTS

| | | |
|---|---|---|
| JP | H01-89882 U | 6/1989 |
| JP | H11-309591 A | 11/1999 |
| JP | 2003-071592 A | 3/2003 |
| JP | 2003-275883 A | 9/2003 |
| JP | 2003275883 A * | 9/2003 |
| JP | 2005-288477 A | 10/2005 |
| JP | 2011-156554 A | 8/2011 |
| KR | 10-1271955 B1 | 7/2013 |
| WO | 2015/027346 A1 | 3/2015 |

* cited by examiner

PLATE-MATERIAL ABUTTING DEVICE

TECHNICAL FIELD

The present invention relates to a plate-material abutting device and a plate-material abutting method for joining plate materials to each other in an abutted state.

BACKGROUND ART

Technologies are known in which blanks (plates that are yet to be pressed) with different plate thicknesses and strengths are abutted with one another and then abutted positions are welded by laser or the like to produce tailored blanks. When the body of an automobile or the like is fabricated, the use of tailored blanks may provide desired strengths with small numbers of parts and may reduce weight.

When a tailored blank is being produced, it is desirable if plural plates are abutted with each other and portions to be joined are abutted and welded in area-contact states. For example, Patent Document 1 recites a device in which a blank 1, in which a first abutted portion and a second abutted portion are separated in a fork, is abutted with a blank 3, in which a third abutted portion and a fourth abutted portion are separated in a fork. The third abutted portion corresponds with the first abutted portion and the fourth abutted portion corresponds with the second abutted portion. During the abutting in this device, the blank 1 and the blank 3 are each moved by actuators 43, formed of reciprocatingly operating devices, to abut the two blanks against each other.

Patent Document 1: Japanese Unexamined Patent Application, Publication No. H11-309591

DISCLOSURE OF THE INVENTION

Problems to be Solved by the Invention

However, in the device according to Patent Document 1, it is difficult to improve the accuracy (alignment of gaps and the like) of both an abutted position of the first abutted portion with the third abutted portion and an abutted position of the second abutted portion with the fourth abutted portion. This is because movement of the blanks by the actuators is stopped at a moment when the pair of abutted portions are first abutted with each other at either of the abutted positions. Considering accuracy of machining of the shapes of the abutted portions of the blanks, it is difficult to match up the gaps at the two abutted positions.

The present invention has been devised in consideration of the above circumstances; an object of the present invention is to provide a plate-material abutting device and a plate-material abutting method in which regulation of plural abutted positions of plural pairs of abutted portions of plate materials is simple.

Means for Solving the Problems

In order to achieve the object described above, the present invention provides a plate-material abutting device for joining a first plate material (for example, a first plate material P1 described below) and a second plate material (for example, a second plate material P2 described below) in a state in which the plate materials are abutted with each other, the first plate material including a first abutted portion (for example, a first abutted portion P11 described below) and a second abutted portion (for example, a second abutted portion P12 described below) that is a portion different from the first abutted portion, the second plate material including a third abutted portion (for example, a third abutted portion P23 described below) corresponding with the first abutted portion and a fourth abutted portion (for example, a fourth abutted portion P24 described below) corresponding with the second abutted portion, and the plate-material abutting device including: a first abutting mechanism (for example, a first abutting mechanism 11 described below) that abuts the first abutted portion with the third abutted portion; and a second abutting mechanism (for example, a second abutting mechanism 12 described below) that abuts the second abutted portion with the fourth abutted portion, the second abutting mechanism moving independently of the first abutting mechanism.

According to the present invention, the first abutting mechanism and the second abutting mechanism move independently. Therefore, when there are plural (two or more) abutted portions in a plate material, even if accuracy of the abutted positions is lowered due to the effects of, for example, warping or deformation of the plate material, the respective abutted portions may be moved independently and the abutted positions may be regulated. Consequently, abutting and joining, such as welding or the like, may be implemented accurately and reliably.

In this device, it is preferable if, at least one of the first abutting mechanism and the second abutting mechanism, one of the abutted portions is fixed and only the other of the abutted portions is moved.

According to the present invention, because the one of the abutted portions is fixed, when the abutted portions are brought together and abutted by, for example, a servo motor, control of the servo motor is simple. In contrast, if both the abutting portions are brought together and abutted by servo motors, control of the servo motors is complex.

In this device, it is preferable to further include a contact plate (for example, a contact plate 21 described below) that regulates contact positions of the first plate material and the second plate material, wherein, when the first plate material and the second plate material are to be abutted in a state in which one of the plate materials is fixed, the contact plate is moved in a direction away from the plate material that is fixed.

In the present invention, because the contact plate moves in the direction away from the plate material that is fixed, rubbing of the contact plate against an end portion (abutted portion) of the plate material that is fixed may be suppressed.

In this device, it is preferable if each of the first abutting mechanism and the second abutting mechanism includes a whole-body moving mechanism (for example, a whole-body moving mechanism 61 described below) that moves the whole body of the abutting mechanism, the whole-body moving mechanisms moving respectively independently.

In the present invention, the whole-body moving mechanisms of the abutted portions respectively independently move the whole of each abutting mechanism. Thus, the whole-body moving mechanisms may respond even if positions of the abutted portions of the plate materials (workpieces) vary in accordance with variations between models, and general applicability is increased. Even for the same model, plate materials have shapes with left-to-right symmetry and the positions of abutted portions vary. In this situation too, the whole-body moving mechanisms of the abutted portions may respond by respectively independently moving the whole of each abutting mechanism.

In this device, it is preferable if at least one of the first abutting mechanism and the second abutting mechanism includes an upper jig (for example, a moving side upper jig 41 described below) and a lower jig (for example, a moving side base table 51 described below) that sandwich the plate materials, the upper jig being coupled with the lower jig.

In the present invention, a driving device for moving the upper jig in directions to bring the plate materials towards and away from one another is unnecessary. Thus, the plate-material abutting device may be simplified. Moreover, at times of maintenance of the plate-material abutting device, the upper jig may be moved by hand. Thus, maintenance of a laser output device and the like above the abutted position is simpler.

The present invention further provides a plate-material abutting method for joining a first plate material and a second plate material in a state in which the plate materials are abutted with each other, the first plate material including a first abutted portion and a second abutted portion that is a portion different from the first abutted portion, the second plate material including a third abutted portion corresponding with the first abutted portion and a fourth abutted portion corresponding with the second abutted portion, and the plate-material abutting method including: a first abutting step of abutting the first abutted portion with the third abutted portion; and a second abutting step of abutting the second abutted portion with the fourth abutted portion.

The present invention includes the first abutting step and the second abutting step. Therefore, when there are plural abutted portions in a plate material, the abutted portions may be abutted at respectively different timings. Consequently, the accuracy of abutted positions may be improved compared to abutting the abutted portions all at once (simultaneously).

In this method, it is preferable if the first plate material includes a fifth abutted portion (for example, a fifth abutted portion P15 described below) between the first abutted portion and the second abutted portion, the second plate material includes a sixth abutted portion (for example, a sixth abutted portion P26 described below) corresponding with the fifth abutted portion, and the plate material abutting method further includes a third abutting step of abutting the fifth abutted portion with the sixth abutted portion, the third abutting step being carried out prior to the first abutting step and the second abutting step.

In the present invention, when there are three pairs of abutted portions, if the fifth abutted portion and the sixth abutted portion in the middle are abutted before the other abutted portions are abutted, there is relatively little strain in the plate materials. Consequently, the accuracy of the abutted positions may be improved further.

Effects of the Invention

According to the present invention, a plate-material abutting device and plate-material abutting method may be provided in which regulation of plural abutted positions of plural pairs of abutted portions of plate materials is simple.

PREFERRED MODE FOR CARRYING OUT THE INVENTION

Herebelow, an embodiment of present invention is described in detail with reference to the attached drawings. As depicted in FIG. 1 to FIG. 3B, a direction in which plate materials P1 and P2 approach one another is referred to as "the approach direction D11" and a direction in which the plate materials P1 and P2 separate from one another is referred to as "the separation direction D12". The approach direction D11 and the separation direction D12 are collectively referred to as "the toward-and-away direction D1". A direction from a lower jig toward an upper jig is referred to as "the upward direction D21" and a direction opposite to the upward direction D21 is referred to as "the downward direction D22". The upward direction D21 and downward direction D22 are collectively referred to as "the up-and-down direction D2". A directional orthogonal to the toward-and-away direction D1 and the up-and-down direction D2 is referred to as "the lateral direction D3".

Figure 1:
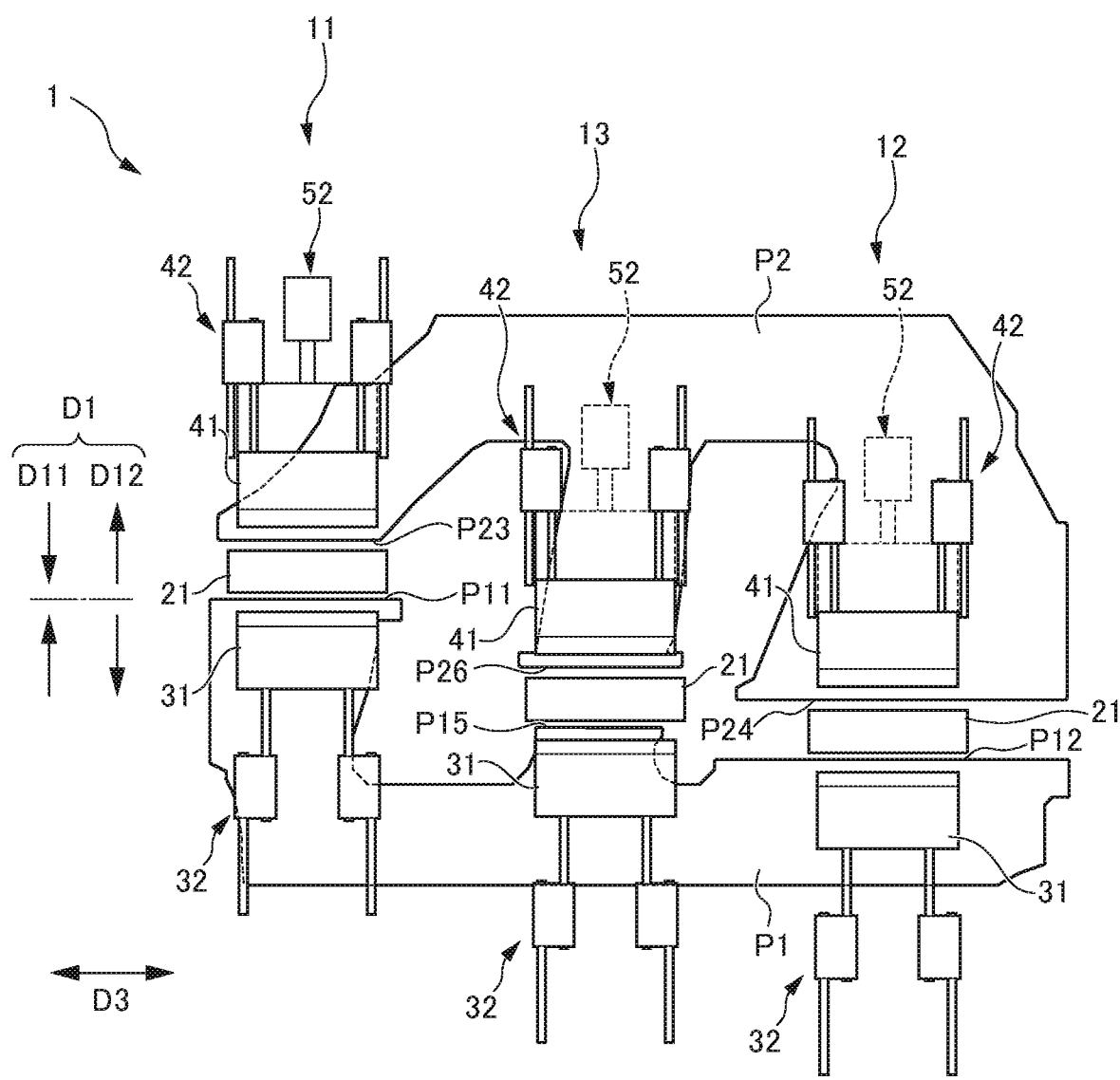
FIG. 1 is a plan view depicting a state of a plate-material abutting device according to an embodiment of the present invention in which plate materials and contact plates are not in contact.
Figure 2:
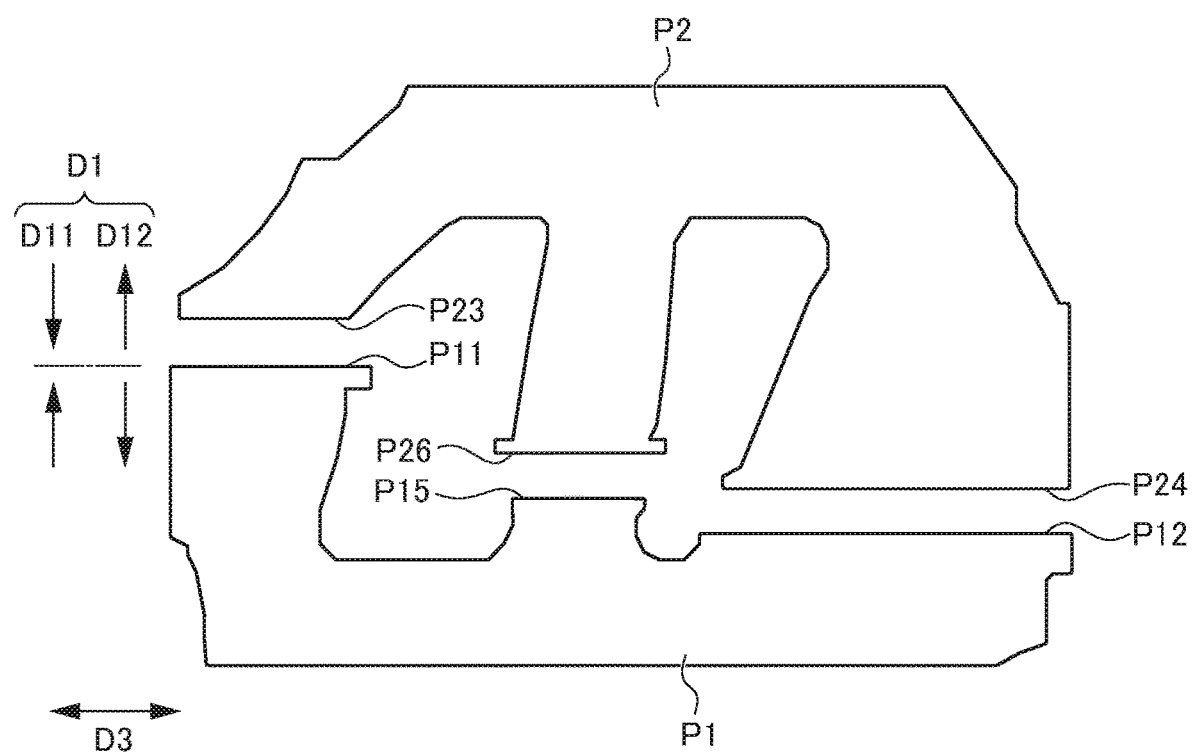
FIG. 2 is a plan view depicting plate materials to be abutted by the plate-material abutting device according to the embodiment of the present invention.
Figure 3A:
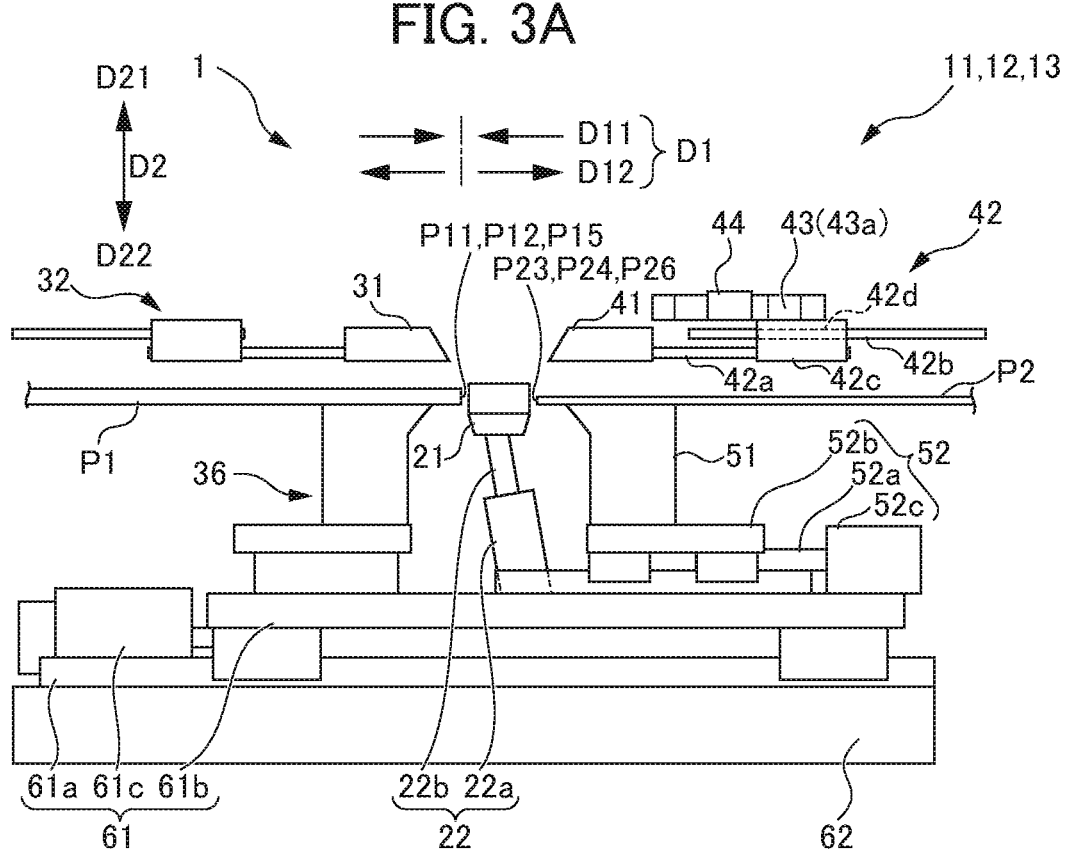
FIG. 3A is a front view depicting a state of an abutting mechanism of the plate-material abutting device according to the embodiment of the present invention in which the plate materials are placed on lower jigs.
Figure 3B:
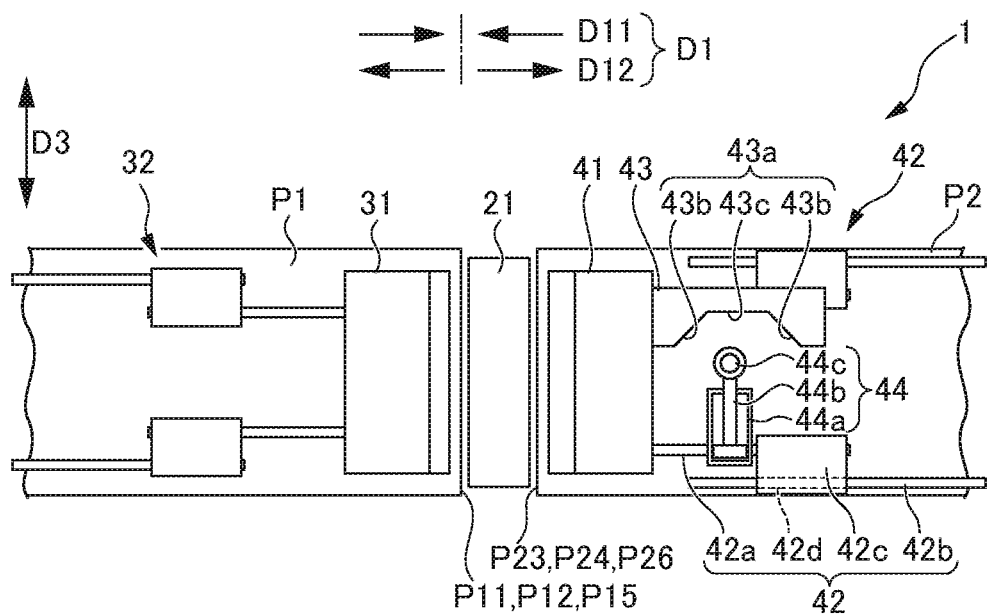
FIG. 3B is a plan view depicting the state of the abutting mechanism of the plate-material abutting device according to the embodiment of the present invention in which the plate materials are placed on the lower jigs.
Figure 4:
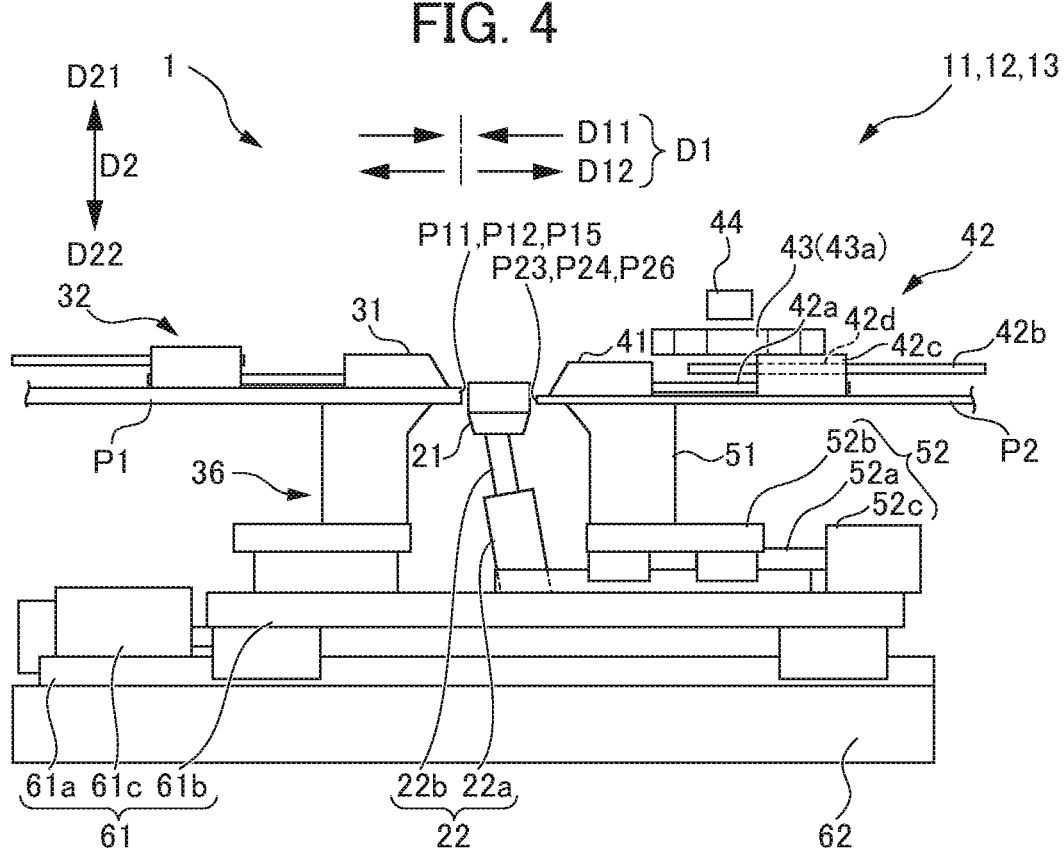
FIG. 4 is a front view depicting a state, after the state depicted in FIG. 3A, in which the plate materials are sandwiched between upper jigs and the lower jigs.
Figure 5:
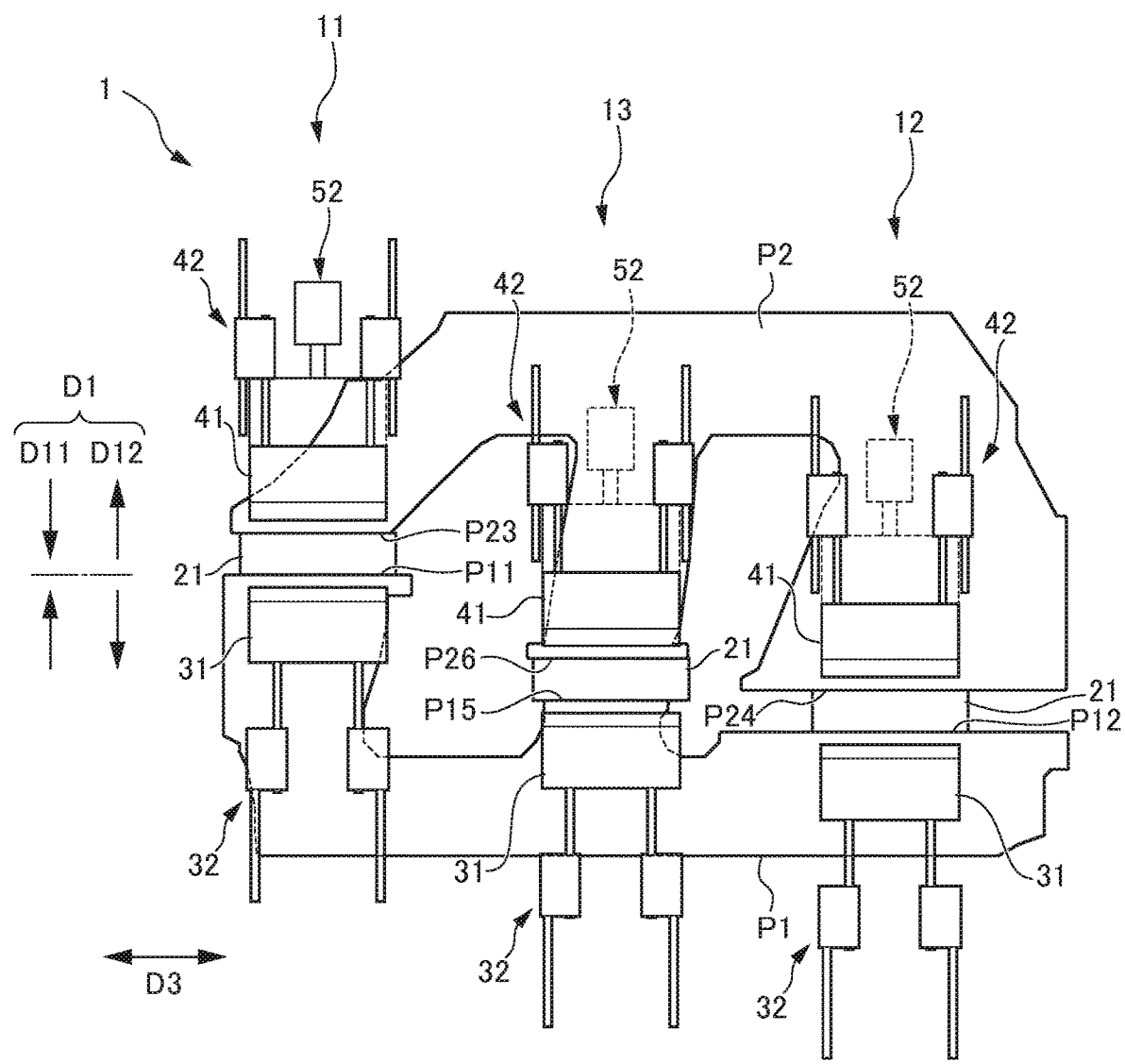
FIG. 5 is a plan view depicting a state, after the state depicted in FIG. 1, in which the plate materials are contacted with the contact plates.
Figure 6:
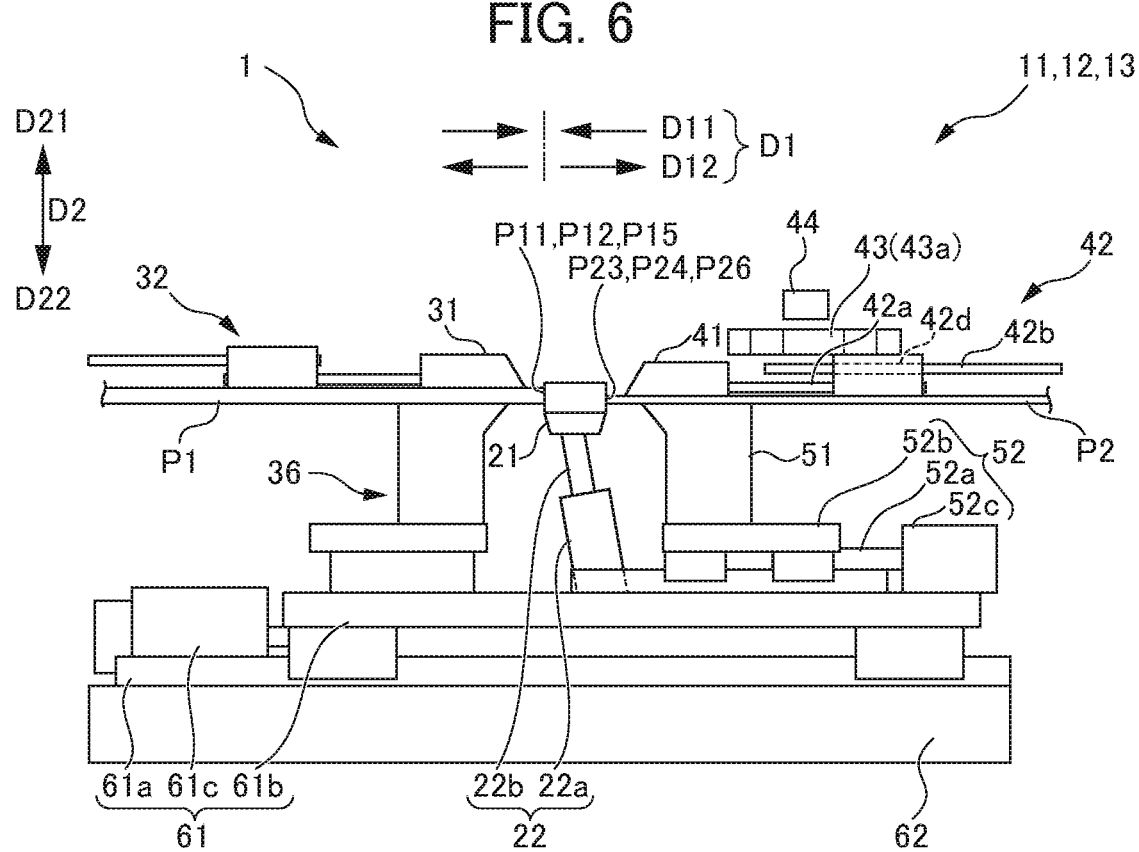
FIG. 6 is a front view depicting a state, after the state depicted in FIG. 4, in which the plate materials are contacted with a contact plate.

FIG. 1 is a plan view depicting a state of a plate-material abutting device according to an embodiment of the present invention in which plate materials and contact plates are not in contact. FIG. 2 is a plan view depicting plate materials to be abutted by the plate-material abutting device according to the embodiment of the present invention. FIG. 3A is a front view depicting a state of an abutting mechanism of the plate-material abutting device according to the embodiment of the present invention in which the plate materials are placed on lower jigs. FIG. 3B is a plan view depicting the state of the abutting mechanism of the plate-material abutting device according to the embodiment of the present invention in which the plate materials are placed on the lower jigs. FIG. 4 is a front view depicting a state, after the state depicted in FIG. 3A, in which the plate materials are sandwiched between upper jigs and the lower jigs. FIG. 5 is a plan view depicting a state, after the state depicted in FIG. 1, in which the plate materials are contacted with the contact plates. FIG. 6 is a front view depicting a state, after the state depicted in FIG. 4, in which the plate materials are contacted with a contact plate.

Figure 7A:
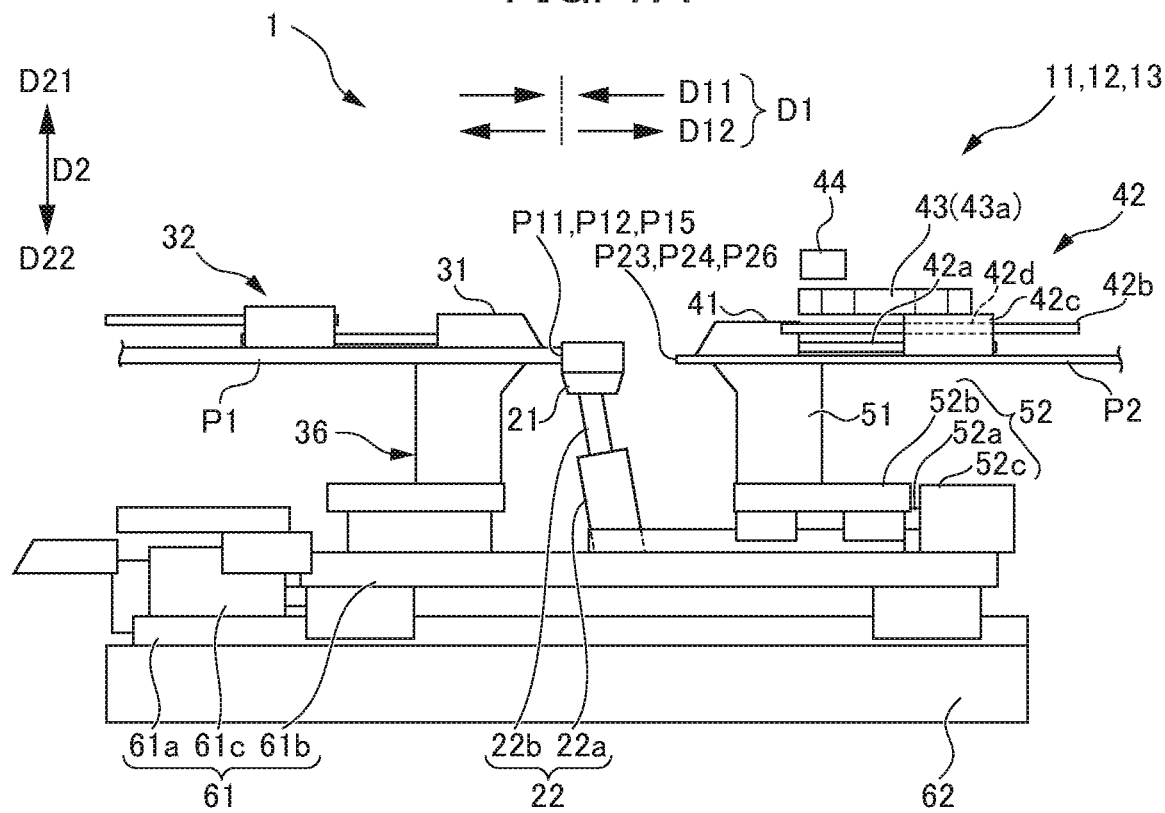
FIG. 7A is a front view depicting a state, after the state depicted in FIG. 6, in which one of the plate materials is moved away from the contact plate.
Figure 7B:
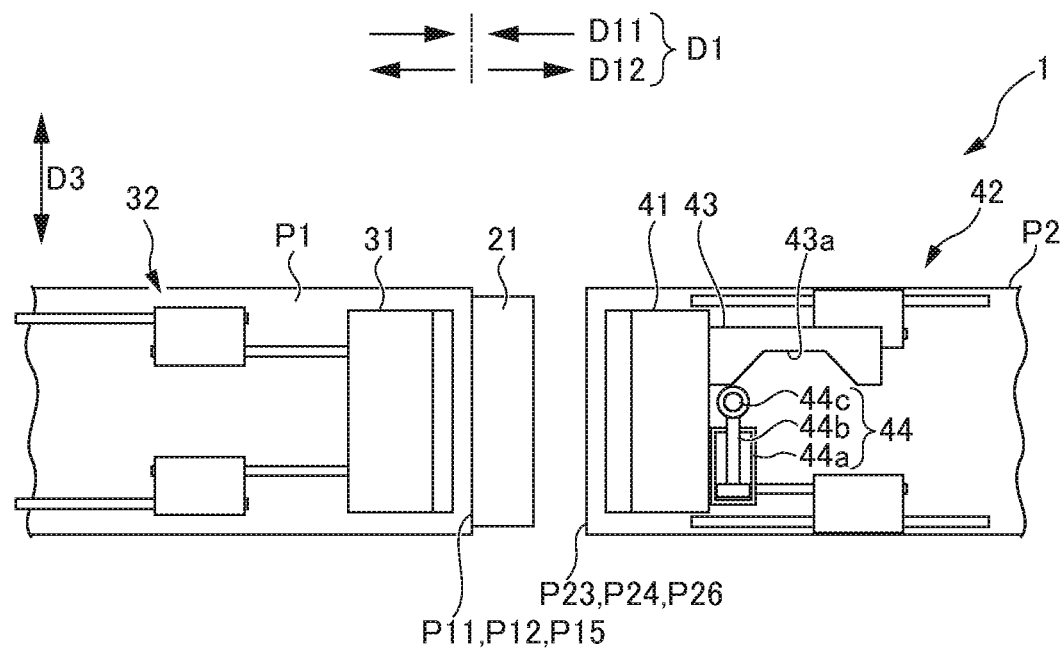
FIG. 7B is a plan view depicting the state, after the state depicted in FIG. 6, in which the one of the plate materials is moved away from the contact plate.
Figure 8A:
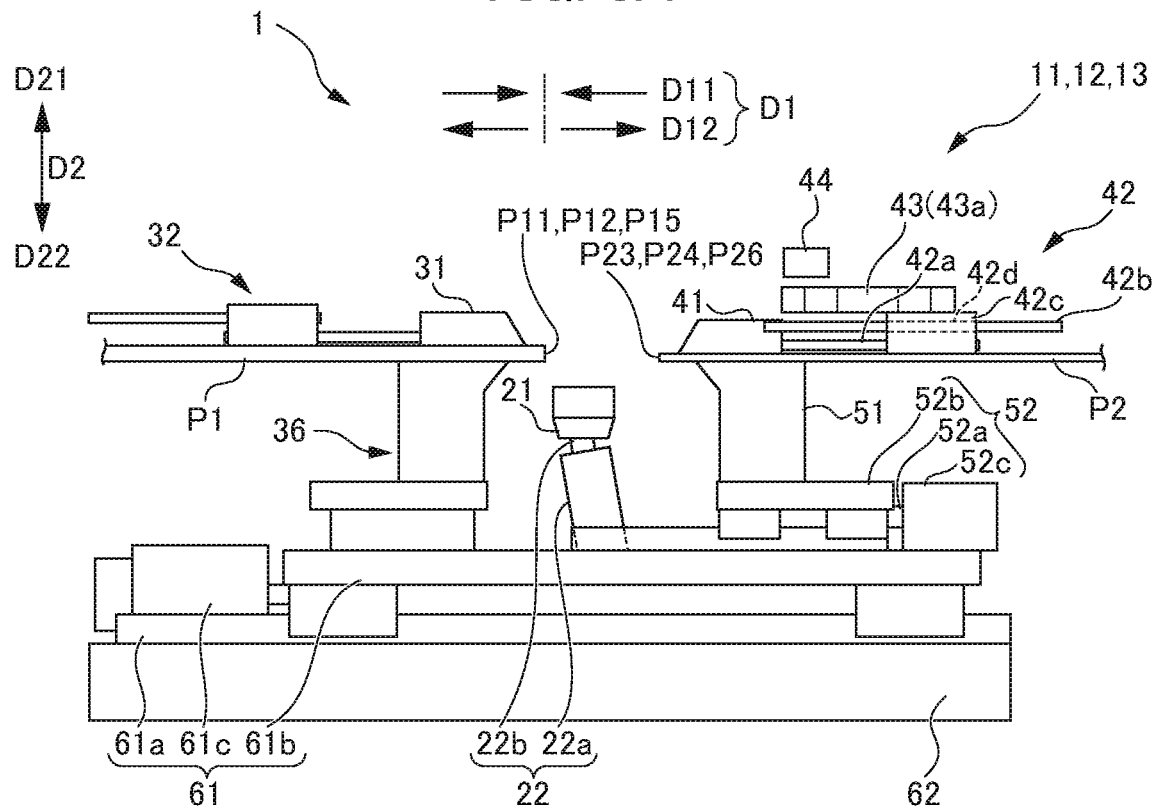
FIG. 8A is a front view depicting a state, after the state depicted in FIG. 7A, in which the contact plate is lowered.
Figure 8B:
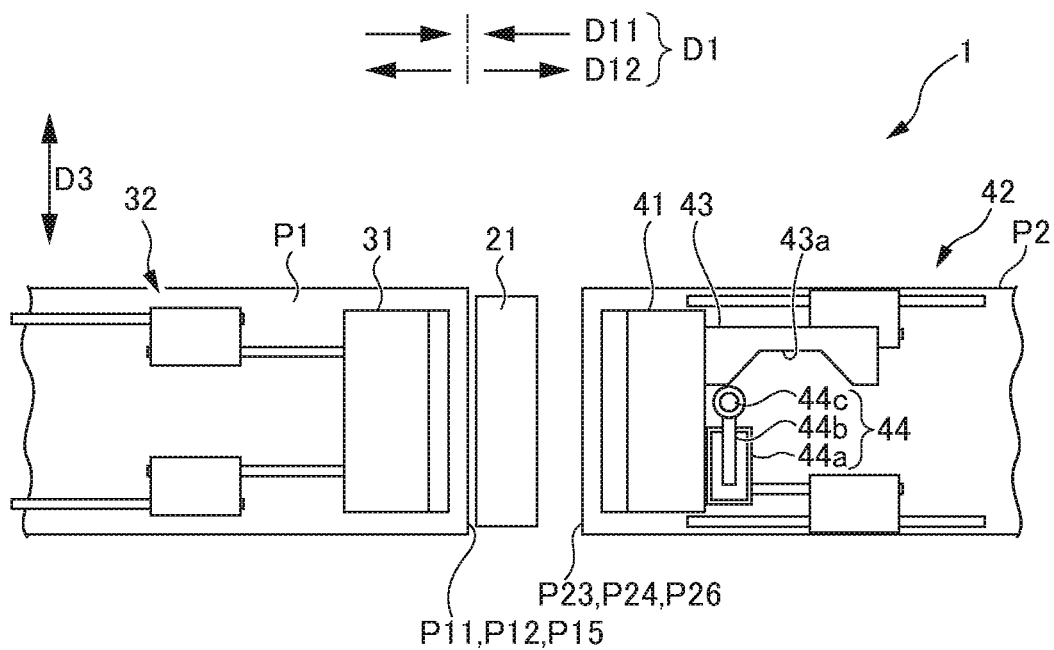
FIG. 8B is a plan view depicting the state, after the state depicted in FIG. 7B, in which the contact plate is lowered.
Figure 9:
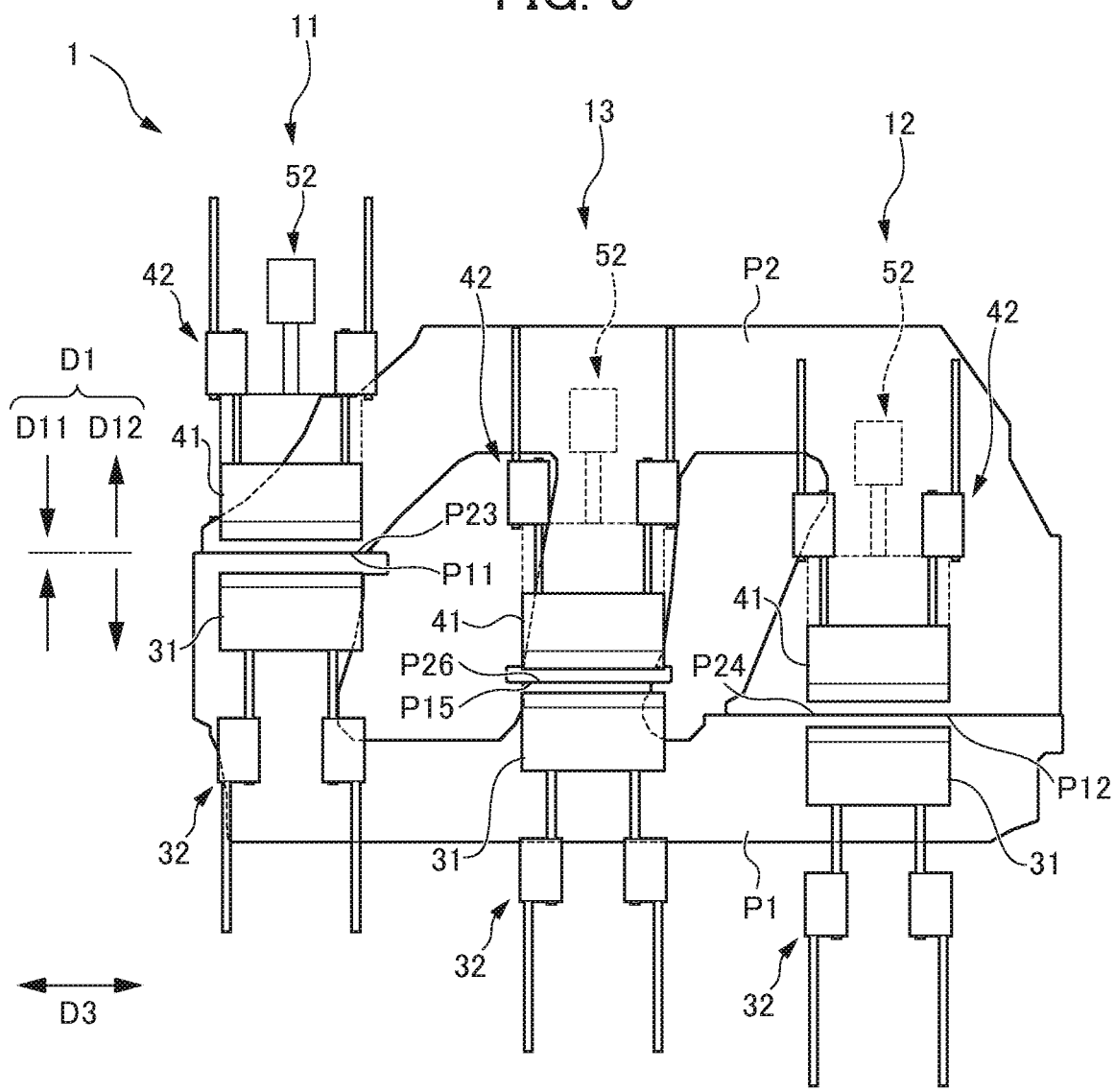
FIG. 9 is a plan view depicting a state, after the state depicted in FIG. 5, in which the plate materials are abutted with one another.
Figure 10A:
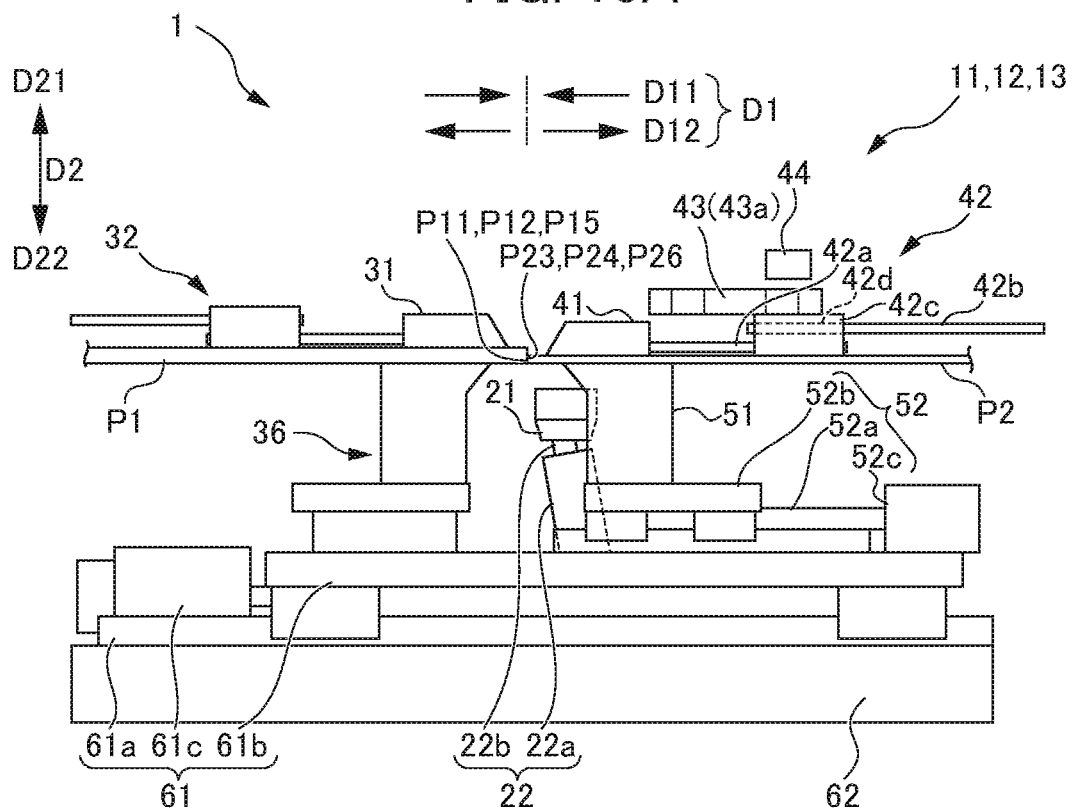
FIG. 10A is a front view depicting a state, after the state depicted in FIG. 8A, in which the plate materials are abutted with one another.
Figure 10B:
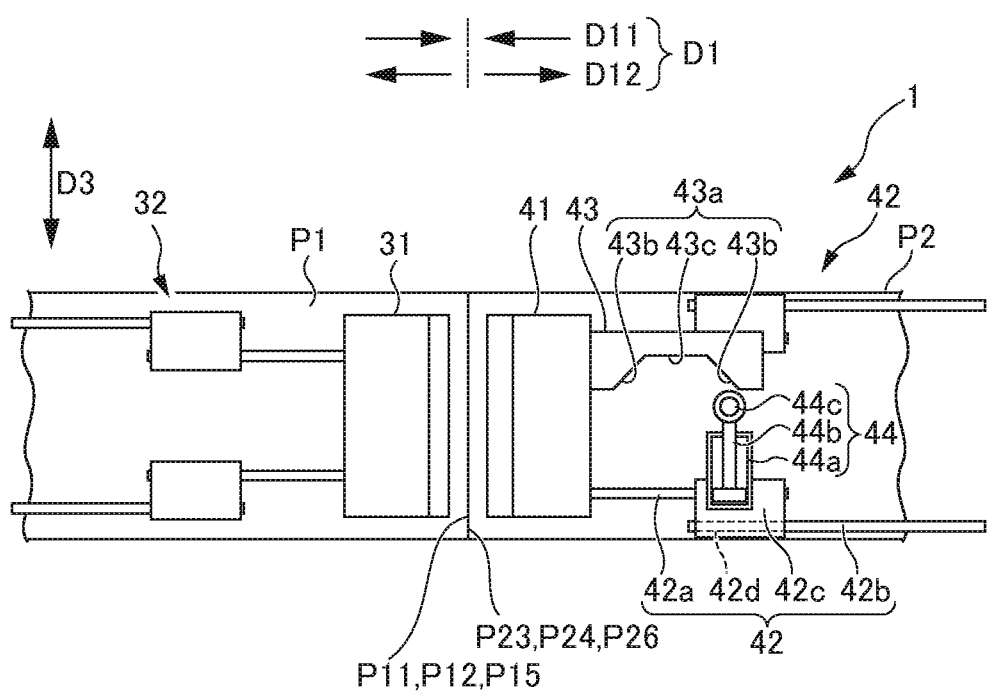
FIG. 10B is a plan view depicting the state, after the state depicted in FIG. 8B, in which the plate materials are abutted with one another.
Figure 11A:
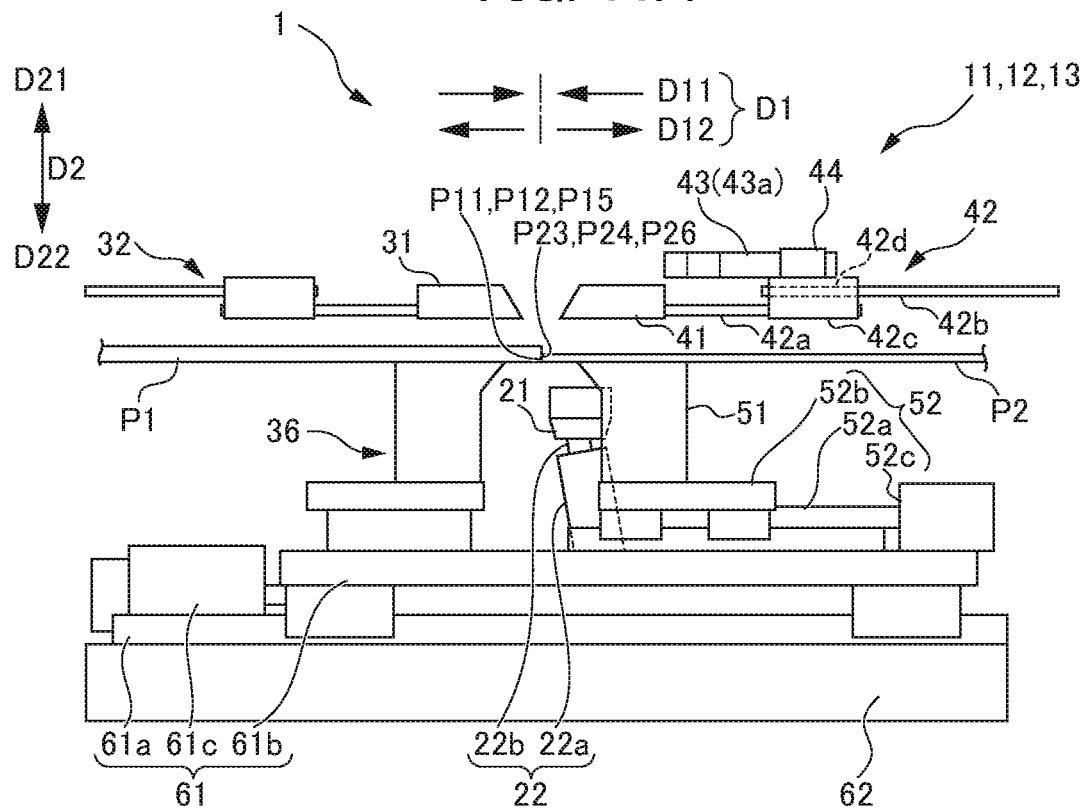
FIG. 11A is a front view depicting a state, after the state depicted in FIG. 10A, in which the upper jigs are raised.
Figure 11B:
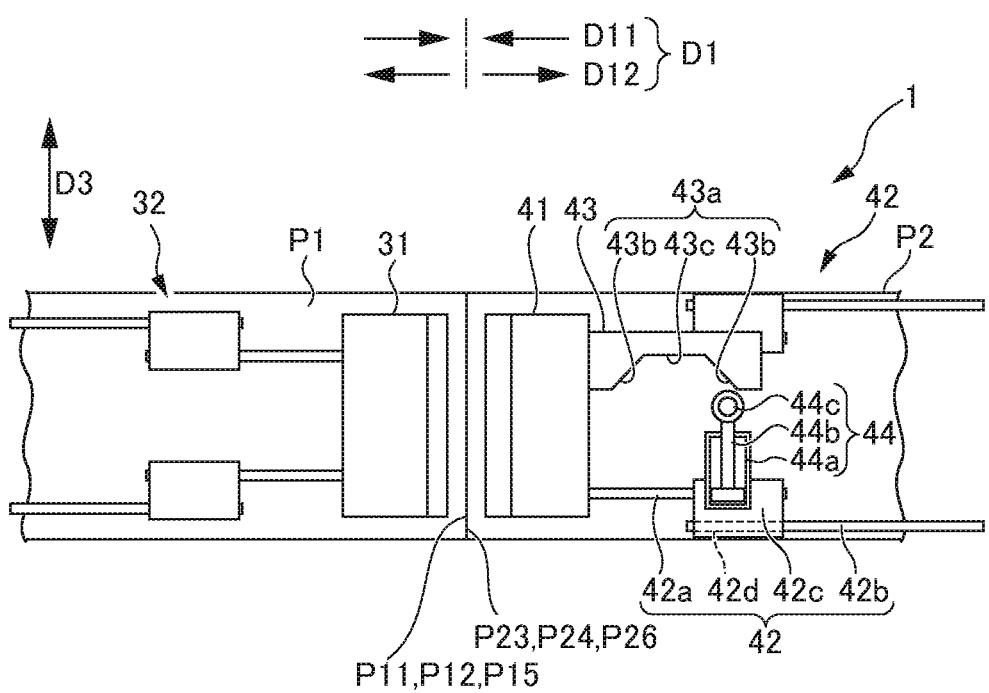
FIG. 11B is a plan view depicting the state, after the state depicted in FIG. 10B, in which the upper jigs are raised.
Figure 12A:
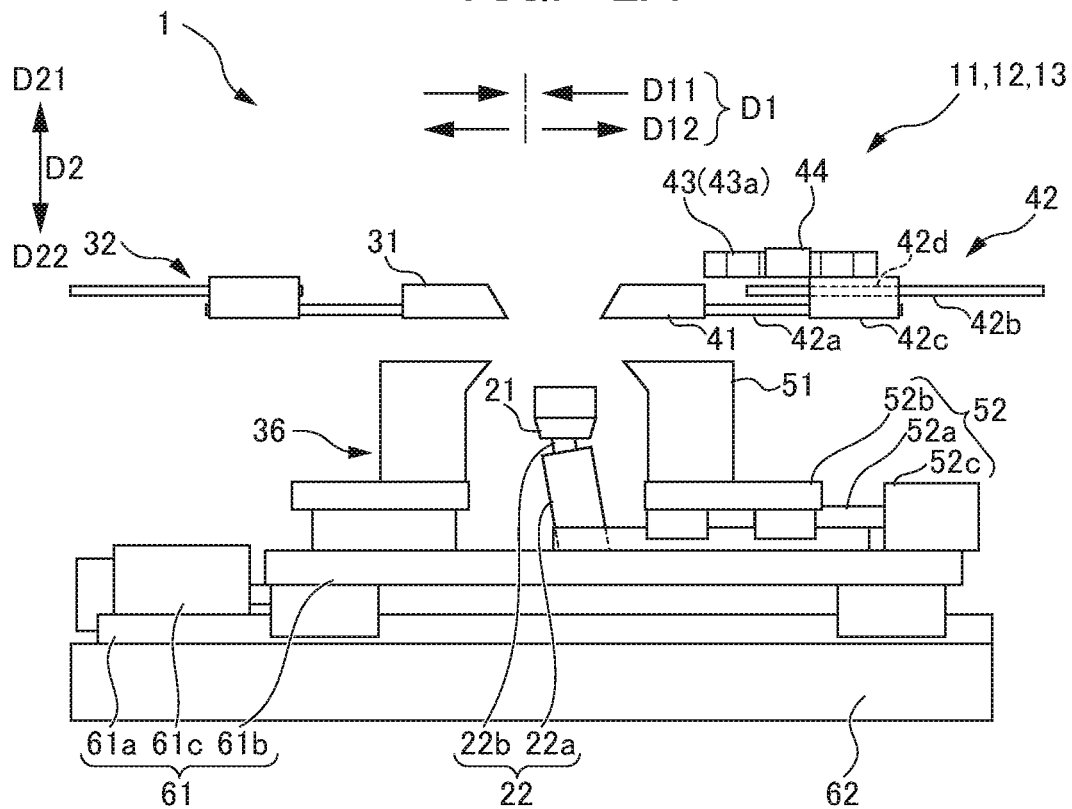
FIG. 12A is a front view depicting a state, after the state depicted in FIG. 11A, in which the upper jigs have been moved to a home position.
Figure 12B:
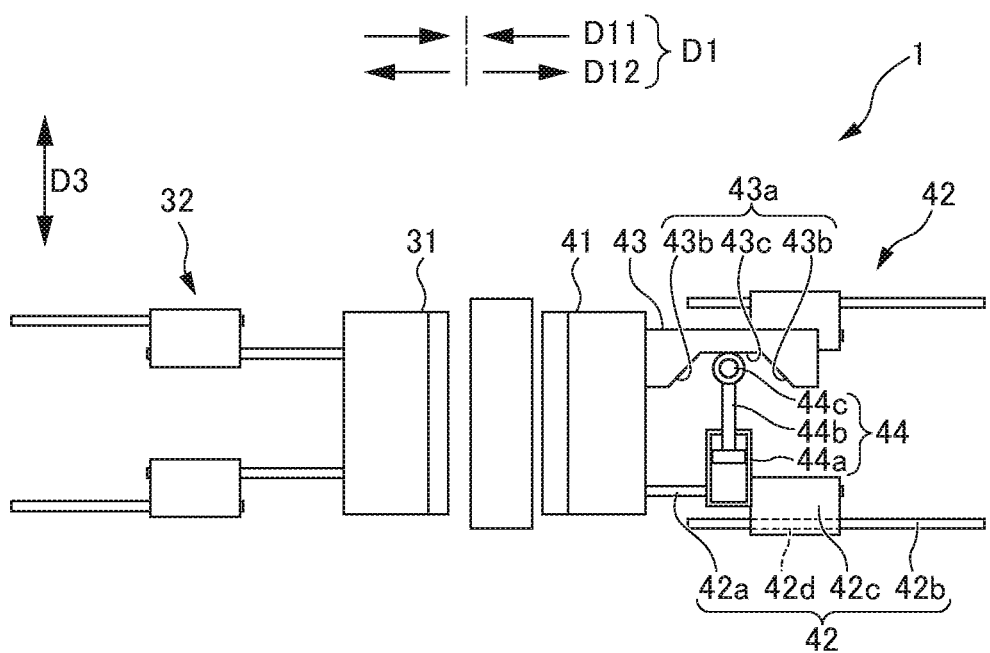
FIG. 12B is a plan view depicting the state, after the state depicted in FIG. 11B, in which the upper jigs have been moved to the home position.

FIG. 7A is a front view depicting a state, after the state depicted in FIG. 6, in which one of the plate materials is moved away from the contact plate. FIG. 7B is a plan view depicting the state, after the state depicted in FIG. 6, in which the one of the plate materials is moved away from the contact plate. FIG. 8A is a front view depicting a state, after the state depicted in FIG. 7A, in which the contact plate is lowered. FIG. 8B is a plan view depicting the state, after the state depicted in FIG. 7B, in which the contact plate is lowered. FIG. 9 is a plan view depicting a state, after the state depicted in FIG. 5, in which the plate materials are abutted with one another. FIG. 10A is a front view depicting a state, after the state depicted in FIG. 8A, in which the plate materials are abutted with one another. FIG. 10B is a plan view depicting the state, after the state depicted in FIG. 8B, in which the plate materials are abutted with one another. FIG. 11A is a front view depicting a state, after the state depicted in FIG. 10A, in which the upper jigs are raised. FIG. 11B is a plan view depicting the state, after the state depicted in FIG. 10B, in which the upper jigs are raised. FIG. 12A is a front view depicting a state, after the state depicted in FIG. 11A, in which the upper jigs have been moved to a home position. FIG. 12B is a plan view depicting the state, after the state depicted in FIG. 11B, in which the upper jigs have been moved to the home position.

As illustrated in FIG. 1 and FIG. 9, a plate-material abutting device 1 according to the present embodiment is a device for joining a first plate material P1 and a second plate material P2 in a state of being abutted to each other. As illustrated in FIG. 2, the first plate material P1 includes three abutted portions P11, P12 and P15. The second plate material P2 includes three abutted portions P23, P24 and P26 that correspond with, respectively, the three abutted portions P11, P12 and P15.

The plate-material abutting device 1 according to the present embodiment includes a first abutting mechanism 11, a second abutting mechanism 12 and a third abutting mechanism 13. The first abutting mechanism 11 is a mechanism that abuts the first abutted portion P11 with the third abutted portion P23. The second abutting mechanism 12 is a mechanism that abuts the second abutted portion P12 with the fourth abutted portion P24. The third abutting mechanism 13 is a mechanism that abuts the fifth abutted portion P15 with the sixth abutted portion P26.

As illustrated in FIG. 1, FIG. 3A and FIG. 3B, the abutting mechanisms 11, 12 and 13 each include a contact plate 21 for regulating contact positions of the first plate material P1 and the second plate material P2. Before a description of the plate-material abutting device 1, the first plate material P1 and the second plate material P2 are described.

As illustrated in FIG. 2, the first plate material P1 and the second plate material P2 have "E" shapes in plan view (shapes in which three horizontal bars extending in the approach direction D11 are linked by a lengthwise bar extending in the lateral direction D3). The first plate material P1 includes the first abutted portion P11, the second abutted portion P12 that is a portion different from the first abutted portion P11, and the fifth abutted portion P15 between the first abutted portion P11 and the second abutted portion P12.

The second plate material P2 includes the third abutted portion P23 corresponding with the first abutted portion P11, the fourth abutted portion P24 corresponding with the second abutted portion P12, and the sixth abutted portion P26 corresponding with the fifth abutted portion P15. The thickness of the second plate material P2 is less than the thickness of the first plate material P1. However, the thickness of the second plate material P2 may be greater than the thickness of the first plate material P1, or may be the same. The material, characteristics and the like of the second plate material P2 may be different from the material, characteristics and the like of the first plate material P1, or may be the same.

An abutted position between the first abutted portion P11 and the third abutted portion P23, an abutted position between the second abutted portion P12 and the fourth abutted portion P24, and an abutted position between the fifth abutted portion P15 and the sixth abutted portion P26 are offset in the toward-and-away direction D1.

A tailored blank whose external shape in plan view is a substantially rectangular shape is formed by the abutted portions P11, P12 and P15 of the first plate material P1 being abutted with and joined to, respectively, the abutting portions P23, P24 and P26 of the second plate material P2. This tailored blank is used as, for example, an inner panel of a door of an automobile.

Now, the plate-material abutting device 1 according to the present embodiment is described in detail. As illustrated in FIG. 1 to FIG. 3B, the present embodiment of the plate-material abutting device 1 includes the first abutting mechanism 11, the second abutting mechanism 12 and the third abutting mechanism 13. The first abutting mechanism 11 is a mechanism that abuts the first abutted portion P11 with the third abutted portion P23. The second abutting mechanism 12 is a mechanism that moves independently of the first abutting mechanism 11 and abuts the second abutted portion P12 with the fourth abutted portion P24. The third abutting mechanism 13 is a mechanism that moves independently of the first abutting mechanism 11 and the second abutting mechanism 12 and abuts the fifth abutted portion P15 with the sixth abutted portion P26. The term "moves independently" is intended to include the capability of moving at separate timings (different timings).

The first abutting mechanism 11, second abutting mechanism 12 and third abutting mechanism 13 have basically similar structures, apart from the abutted portions that they cause to abut being different and the like. Therefore, except where particularly required, descriptions below are given using the first abutting mechanism 11 as a representative example. The descriptions of the first abutting mechanism 11 are also applicable to the second abutting mechanism 12 and the third abutting mechanism 13.

As illustrated in FIG. 1 to FIG. 10B, the first abutting mechanism 11 is principally equipped with a fixed side upper jig 31, a fixed side base table 36, a moving side upper jig 41, a moving side base table 51, the contact plate 21, a whole-body moving mechanism 61, and a base table moving mechanism 52.

The fixed side base table 36 is a table portion on which the first plate material P1 is placed. The moving side base table 51 is a table portion on which the second plate material P2 is placed. Placing surfaces at upper portions of the two base tables 36 and 51 function as lower jigs paired with, respectively, the upper jigs 31 and 41. The placing surfaces at the upper portions of the two base tables 36 and 51 are separated from one another by a predetermined spacing in the toward-and-away direction D1.

The fixed side upper jig 31 opposes the placing surface of the fixed side base table 36 that functions as the lower jig in the up-and-down direction D2. The fixed side upper jig 31 is movable in the up-and-down direction D2. In a lowered state, the fixed side upper jig 31 may sandwich the first plate material P1 between the placing surface of the fixed side base table 36 and the fixed side upper jig 31.

The moving side upper jig 41 opposes the placing surface of the moving side base table 51 that functions as the lower jig in the up-and-down direction D2. The moving side upper jig 41 is movable in the up-and-down direction D2. In a lowered state, the moving side upper jig 41 may sandwich the second plate material P2 between the placing surface of the moving side base table 51 and the moving side upper jig 41.

The whole-body moving mechanism 61 is a mechanism that moves the fixed side upper jig 31, the fixed side base table 36, the moving side upper jig 41, the moving side base table 51, the contact plate 21 and such in the toward-and-away direction D1 relative to a whole-body base 62. The whole-body moving mechanism 61 is equipped with a whole-body rail 61a, a whole-body slider 61b, and a whole-body drive source 61c. The whole-body rail 61a is fixed to an upper portion of the whole-body base 62 and extends in the toward-and-away direction D1. The whole-body slider 61b is slidable in the toward-and-away direction D1 relative to the whole-body rail 61a. The whole-body drive source 61c generates driving force to slide the whole-body slider 61b. A servo motor and a pneumatic cylinder are illustrative examples of the whole-body drive source 61c.

The whole-body moving mechanisms 61 of the abutting mechanisms 11 to 13 independently move, respectively, the whole of the first abutting mechanism 11, the whole of the second abutting mechanism 12 and the whole of the third abutting mechanism 13. In other words, the whole-body moving mechanisms 61 of the abutting mechanisms 11 to 13 are provided at each of the abutted portions (that is, at each of the abutting mechanisms 11 to 13) and can respectively independently move the whole bodies of the abutting mechanisms 11 to 13. Therefore, even if positions of the abutted portions of the plate materials (workpieces) vary in accordance with variations between models, the whole-body moving mechanisms 61 of the abutting mechanisms 11 to 13 can respond by respectively independently moving the whole bodies of the abutting mechanisms 11 to 13, and general applicability is increased. Even for the same model, plate materials have shapes with left-to-right symmetry and the positions of abutted portions vary. In this situation too, the whole-body moving mechanisms 61 of the abutting mechanisms 11 to 13 can respond by respectively independently moving the whole bodies of the abutting mechanisms 11 to 13.

The fixed side base table 36 is fixed to an upper portion of the whole-body slider 61b. That is, a relative position of the fixed side base table 36 with respect to the whole-body slider 61b does not change. The moving side base table 51 is fixed to the upper portion of the whole-body slider 61b via the base table moving mechanism 52. In detail, the base table moving mechanism 52 is equipped with a moving side rail 52a, a moving side slider 52b and a moving side drive source 52c. The moving side rail 52a is fixed to the upper portion of the whole-body slider 61b and extends in the toward-and-away direction D1. The moving side slider 52b is slidable in the toward-and-away direction D1 relative to the moving side rail 52a. The moving side drive source 52c generates driving force to slide the moving side slider 52b. A servo motor and a pneumatic cylinder are illustrative examples of the moving side drive source 52c. A relative position of the moving side base table 51 with respect to the whole-body slider 61b can be changed.

Thus, of the abutted portions at the first abutting mechanism 11, the second abutting mechanism 12 and the third abutting mechanism 13, the first abutted portion P11, the second abutted portion P12 and the fifth abutted portion P15 are fixed to the whole-body sliders 61b indirectly (i.e., the positions of these abutted portions relative to the whole-body sliders 61b do not change). Meanwhile, only the third abutted portion P23, the fourth abutted portion P24 and the sixth abutted portion P26 are movable relative to the whole-body sliders 61b (i.e., the positions of these abutted portions relative to the whole-body sliders 61b can be changed).

The fixed side base table 36 and the moving side base table 51 are equipped with means for adhering the first plate material P1 and the second plate material P2 to the respective placing surfaces thereof. In the present embodiment, electromagnets are provided inside the fixed side base table 36 and the moving side base table 51. Electromagnetic attraction forces attracting the first plate material P1 and the second plate material P2 to the respective placing surfaces of the fixed side base table 36 and the moving side base table 51 are generated by electrification of the electromagnets. In particular, magnetic force lines that contribute to the attraction forces are increased by the presence of the fixed side upper jig 31 and the moving side upper jig 41, and the attraction forces are increased.

The fixed side upper jig 31 is attracted to the fixed side base table 36 by electromagnetic attraction force, with the first plate material P1 therebetween. Similarly, the moving side upper jig 41 is attracted to the moving side base table 51, with the second plate material P2 therebetween. Thus, the moving side upper jig 41 may be coupled with the moving side base table 51. As alternative means for adhering, negative pressure suction devices provided at the outside of the fixed side base table 36 and the moving side base table 51 or the like can be mentioned.

One end portion of a fixed side upper jig moving mechanism 32 is linked to the fixed side upper jig 31. Another end portion of the fixed side upper jig moving mechanism 32 is linked to an up-and-down direction driving unit (not illustrated). The up-and-down direction driving unit moves the fixed side upper jig moving mechanism 32 and the fixed side upper jig 31 linked thereto in the up-and-down direction.

A moving side upper jig moving mechanism 42 is equipped with jig side bar members 42a, proximal end side bar members 42b, upper jig side sliders 42c, a following cam portion 43, and a following cam pushing mechanism 44. The jig side bar members 42a, proximal end side bar members 42b and upper jig side sliders 42c are provided in pairs (sets) in the lateral direction D3. One end portion of each jig side bar member 42a is linked to the moving side upper jig 41 and another end portion of the jig side bar member 42a is linked to the upper jig side slider 42c. The upper jig side slider 42c includes an insertion hole 42d at which one end portion side of the proximal end side bar member 42b is inserted. The one end portion side of the proximal end side bar member 42b is inserted into the insertion hole 42d and another end portion of the proximal end side bar member 42b is linked to an up-and-down direction driving unit (not illustrated).

The up-and-down direction driving unit moves the moving side upper jig moving mechanism 42 and the moving side upper jig 41 linked thereto only in the up-and-down direction. A distance between the moving side upper jig 41 and the upper jig side sliders 42c in the toward-and-away direction D1 is constant. When the moving side upper jig 41 moves in the toward-and-away direction D1, a protrusion length of the one end portion of the proximal end side bar member 42b from the insertion hole 42d of each upper jig side slider 42c changes.

The following cam portion 43 is connected to one of the upper jig side sliders 42c. As illustrated in FIG. 11A and FIG. 11B, the following cam pushing mechanism 44 is provided at a position that opposes the following cam portion 43 in a state in which the moving side upper jig moving mechanism 42 is raised. A cam surface 43a in a recess shape is provided at an opposing face of the following cam portion 43 that opposes the following cam pushing mechanism 44. The cam surface 43a includes angled surfaces 43b at both ends thereof in the toward-and-away direction D1 and a flat surface 43c between the angled surfaces 43b.

The following cam pushing mechanism 44 is equipped with a cam cylinder 44a, a cam piston 44b, and a contact wheel 44c. The cam piston 44b is structured to be capable of freely protruding from the cam cylinder 44a. The contact wheel 44c is provided to be freely turnable at a distal end portion of the cam piston 44b. A rotation axis of the contact wheel 44c extends in the up-and-down direction D2. In a state in which the contact wheel 44c opposes one of the angled surfaces 43b of the cam surface 43a, the contact wheel 44c may push the angled surface 43b by the cam piston 44b protruding from the cam cylinder 44a.

The contact plates 21 are plates for regulating contact positions of the first plate material P1 and the second plate material P2. As illustrated in FIG. 3A, FIG. 3B, FIG. 8A, FIG. 8B and so forth, when seen in the lateral direction D3, each contact plate 21 can be moved in a diagonal direction by a contact plate moving mechanism 22. The term "diagonal direction" is intended to include a direction that is angled downward in the direction of the second plate material P2 separating from the first plate material P1. The contact plate moving mechanism 22 is equipped with a contact plate cylinder 22a and a contact plate piston 22b. The contact plate piston 22b is structured to be capable of freely protruding from the contact plate cylinder 22a. Therefore, when the first plate material P1 and the second plate material P2 are to be abutted in a state in which the first plate material P1 is fixed, the contact plate 21 may be moved in a direction away from the first plate material P1 that is fixed.

Now, an example of a plate-material abutting method according to the plate-material abutting device 1 with the structure described above is described. First, the whole bodies of the abutting mechanisms 11 to 13 are respectively independently moved by the whole-body moving mechanisms 61 to 13 to predetermined positions to match up with the abutted positions of the plate materials. The whole bodies of the abutting mechanisms 11 to 13 are respectively moved by the whole-body moving mechanisms 61 and positions of the abutting mechanisms 11 to 13 are fixed, after which an abutting operation is started.

As illustrated in FIG. 1, FIG. 3A and FIG. 3B, in a state in which the fixed side upper jigs 31 and moving side upper jigs 41 are raised, the first plate material P1 and the second plate material P2 are placed on, respectively, the placing surfaces of the fixed side base tables 36 that function as lower jigs and the placing surfaces of the moving side base tables 51 that function as lower jigs. At this time, the abutted portions P11, P12 and P15 of the first plate material P1 and the abutted portions P23, P24 and P26 of the second plate material P2 are not in contact with the contact plates 21. There may be slight contact between the abutted portions and the contact plates 21. For convenience, however, states in which the abutted portions are apart from the contact plates 21 are depicted in FIG. 1, FIG. 3A, FIG. 3B and FIG. 4.

Then, as illustrated in FIG. 4, each fixed side upper jig moving mechanism 32 and moving side upper jig moving mechanism 42 is lowered. Thus, each fixed side upper jig 31 and moving side upper jig 41 is lowered, the first plate material P1 is sandwiched between the fixed side base table 36 and the fixed side upper jig 31, and the second plate material P2 is sandwiched between the moving side base table 51 and the moving side upper jig 41. The electromagnets in the fixed side base table 36 and the moving side base table 51 are electrified, and electromagnetic attraction forces are generated. The electromagnetic attraction forces are generated and stopped as appropriate, although the timings are not described here.

Then, as illustrated in FIG. 5 and FIG. 6, each base table moving mechanism 52 is driven and the moving side base table 51 is moved in the approach direction D11 to approach the contact plate 21 and the fixed side base table 36. Thus, the abutted portions P11, P12 and P15 of the first plate material P1 are contacted with one contact faces of the contact plates 21, and the abutted portions P23, P24 and P26 of the second plate material P2 are contacted with other contact faces of the contact plates 21. Each contact plate 21 is linked to a distal end portion of the contact plate piston 22b with some free play. Therefore, the contact plates 21 contact the abutted portions P11, P12 and P15 of the first plate material P1 and the abutted portions P23, P24 and P26 of the second plate material P2 in appropriate attitudes.

Then, as illustrated in FIG. 7A and FIG. 7B, each base table moving mechanism 52 is driven and moves the moving side base table 51 in the separation direction D12 away from the contact plate 21 and the fixed side base table 36. Thus, the abutted portions P23, P24 and P26 of the second plate material P2 are separated from the other contact faces of the contact plates 21.

Then, as illustrated in FIG. 8A and FIG. 8B, the contact plate moving mechanisms 22 are driven and the contact plates 21 are moved diagonally downward so as to separate from the abutted portions P11, P12 and P15 of the first plate material P1. Thus, the abutted portions P11, P12 and P15 of the first plate material P1 are separated from the one contact faces of the contact plates 21.

Then, as illustrated in FIG. 9, FIG. 10A and FIG. 10B, each base table moving mechanism 52 is driven and the moving side base table 51 is moved in the approach direction D11 to approach the fixed side base table 36. Thus, the abutted portions P11, P12 and P15 of the first plate material P1 are abutted with the abutted portions P23, P24 and P26 of the second plate material P2.

More specifically, at least one of a first abutting step of abutting of the first abutted portion P11 with the third abutted portion P23 by the first abutting mechanism 11, a second abutting step of abutting of the second abutted portion P12 with the fourth abutted portion P24 by the second abutting mechanism 12, and a third abutting step of abutting of the fifth abutted portion P15 with the sixth abutted portion P26 by the third abutting mechanism 13 is carried out at a separate timing. To be specific, the third abutting step is carried out prior to the first abutting step and the second abutting step.

Then, each of the abutted portions P11, P12 and P15 of the first plate material P1 is welded to the respective abutted portion P23, P24 or P26 of the second plate material P2 by a welding apparatus. Laser welding and arc welding are illustrative examples of the welding method.

Then, the electrification of the electromagnets is stopped and the generation of the electromagnetic attraction forces is stopped. Subsequently, as illustrated in FIG. 11A and FIG. 11B, each fixed side upper jig moving mechanism 32 and moving side upper jig moving mechanism 42 is raised, thus raising, respectively, the fixed side upper jig 31 and the moving side upper jig 41. In this state, the following cam pushing mechanism 44 opposes one of the angled surfaces 43b of the recess-shaped cam surface 43a of the following cam portion 43. The following cam pushing mechanism 44 causes the cam piston 44b to progressively protrude from the cam cylinder 44a. As a result, the contact wheel 44c linked to the distal end portion of the cam cylinder 44a progressively pushes against the angled surface 43b of the recess-shaped cam surface 43a of the following cam portion 43. The following cam portion 43 is connected to the upper jig side slider 42c that is slidable in the toward-and-away direction D1. Therefore, the following cam portion 43 progressively moves in the separation direction D12 in association with the protrusion of the cam piston 44b.

As illustrated in FIG. 12A and FIG. 12B, when the contact wheel 44c is disposed at the flat surface 43c of the recess-shaped cam surface of the following cam portion 43, movement of the following cam portion 43 in the separation direction D12 stops. Thus, the moving side upper jig 41 is returned to a home position.

According to the plate-material abutting device 1 relating to the present embodiment, for example, the following effects are provided. In the present embodiment of the plate-material abutting device 1, the first plate material P1 includes the first abutted portion P11 and the second abutted portion P12 that is a portion different from the first abutted portion P11, and the second plate material P2 includes the third abutted portion P23 corresponding with the first abutted portion P11 and the fourth abutted portion P24 corresponding with the second abutted portion P12. The plate-material abutting device 1 includes the first abutting mechanism 11 that abuts the first abutted portion P11 with the third abutted portion P23, and the second abutting mechanism 12 that moves independently of the first abutting mechanism 11 and abuts the second abutted portion P12 with the fourth abutted portion P24.

According to the present embodiment, the first abutting mechanism 11 and the second abutting mechanism 12 move independently. Therefore, when there are plural (two or more) abutted portions in a plate material, even if accuracy of the abutted positions is lowered due to the effects of, for example, warping or deformation of the plate material, the respective abutted portions may be moved independently and the abutted positions may be regulated. Consequently, abutting and joining, such as welding or the like, may be implemented accurately and reliably.

In the present embodiment of the plate-material abutting device 1, the abutted portions P11, P12 and P15 of the first plate material P1 are fixed by the first abutting mechanism 11, the second abutting mechanism 12 and the third abutting mechanism 13; only the abutted portions P23, P24 and P26 of the second plate material P2 are moved by the abutting mechanisms.

According to the present embodiment, because the abutted portions P11, P12 and P15 of the first plate material P1 are fixed, when the abutted portions P23, P24 and P26 of the second plate material P2 are being brought closer and abutted by the moving side drive sources 52c formed with, for example, servo motors, control of the servo motors is simple. If the abutted portions P11, P12 and P15 of the first plate material P1 and the abutted portions P23, P24 and P26 of the second plate material P2 were both brought together and abutted by servo motors, control of the servo motors would be complicated.

The present embodiment of the plate-material abutting device 1 includes the contact plates 21 for regulating contact positions of the first plate material P1 and the second plate material P2. When the first plate material P1 and the second plate material P2 are to be abutted in the state in which the first plate material P1 is fixed, the contact plates 21 are moved in directions away from the first plate material P1 that is fixed.

According to the present embodiment, because the contact plates 21 are moved in the directions away from the fixed first plate material P1, rubbing of the contact plates 21 against end portions of the fixed first plate material P1 (i.e., the abutted portions P11, P12 and P15) may be suppressed.

In the present embodiment of the plate-material abutting device 1, the first abutting mechanism 11, the second abutting mechanism 12 and the third abutting mechanism 13 each include the moving side upper jig 41 and moving side base table 51 that sandwich the plate materials P1 and P2, and the moving side upper jig 41 is coupled with the moving side base table 51.

According to the present embodiment, a driving device for moving the moving side upper jig 41 in the toward-and-away direction D1 is unnecessary. Thus, the plate-material abutting device 1 may be simplified. Moreover, at times of maintenance of the plate-material abutting device 1, the moving side upper jig 41 may be moved by hand. Thus, maintenance of a laser output device and the like above the abutted position is simpler.

The plate-material abutting method according to the present embodiment includes the first abutting step of abutting the first abutted portion P11 with the third abutted portion P23 and the second abutting step of abutting the second abutted portion P12 with the fourth abutted portion P24.

According to the present embodiment of the plate-material abutting method, when there are plural abutted portions in the plate materials P1 and P2, the abutted portions may be abutted at respectively different timings. Therefore, the accuracy of abutted positions may be improved compared to abutting the abutted portions all at once (simultaneously).

In the present embodiment of the plate-material abutting method, the first plate material P1 includes the fifth abutted portion P15 between the first abutted portion P11 and the second abutted portion P12, and the second plate material P2 includes the sixth abutted portion P26 corresponding with the fifth abutted portion P15. The third abutting step of abutting the fifth abutted portion P15 with the sixth abutted portion P26 is carried out prior to the first abutting step and the second abutting step.

According to the present embodiment, when there are three pairs of abutted portions, if the fifth abutted portion P15 and the sixth abutted portion P26 in the middle are abutted before the other abutted portions are abutted, there is relatively little strain in the plate materials P1 and P2. Consequently, the accuracy of the abutted positions may be improved further.

The present invention is not limited by the above embodiment. Modifications and improvements within a scope in which the objective of the invention may be achieved are to be encompassed by the present invention. For example: the number of abutted portions provided at a plate material may be two, and may be four or more; each abutting mechanism may be structured so as to move abutted portions of both the plate materials, in which case it is preferable if the drive sources are pneumatic cylinders rather than servo motors; the plate-material abutting device need not be equipped with the contact plates; and the method of joining the first plate material with the second plate material may be a method other than welding.

EXPLANATION OF REFERENCE NUMERALS

P1 First plate material
P2 Second plate material
P11 First abutted portion
P12 Second abutted portion
P23 Third abutted portion
P24 Fourth abutted portion
P15 Fifth abutted portion
P26 Sixth abutted portion
1 Plate-material abutting device
11 First abutting mechanism
12 Second abutting mechanism
13 Third abutting mechanism
21 Contact plate
31 Fixed side upper jig
36 Fixed side base table
41 Moving side upper jig (upper jig)
51 Moving side base table (lower jig)

The invention claimed is:

1. A plate-material abutting device for joining a first plate material and a second plate material in a state in which the plate materials are abutted with each other,
the first plate material including a first abutted portion and a second abutted portion that is a portion different from the first abutted portion,
the second plate material including a third abutted portion corresponding with the first abutted portion and a fourth abutted portion corresponding with the second abutted portion,
and the plate-material abutting device comprising:
a first abutting mechanism that abuts the first abutted portion with the third abutted portion; and
a second abutting mechanism that abuts the second abutted portion with the fourth abutted portion, the second abutting mechanism moving independently of the first abutting mechanism wherein
the first plate material and the second plate material are configured to approach to and separate from each other, and
the first abutting mechanism and the second abutting mechanism are configured to be moved independently of each other in approach and separation directions of the first plate material and the second plate material.

2. The plate-material abutting device according to claim 1, wherein at least one of the first abutting mechanism and the second abutting mechanism is configured such that when a joining operation is being performed by the plate-material abutting device, one of the abutted portions abutted by said at least one of the first abutting mechanism and the second abutting mechanism is fixed and only the other of the abutted portions abutted thereby is moved relative to the one abutted portion that is fixed.

3. The plate-material abutting device according to claim 2, further comprising a contact plate that regulates contact positions of the first plate material and the second plate material,
wherein, the contact plate is configured such that when the first plate material and the second plate material are to be abutted in a state in which one of the plate materials is fixed, the contact plate is moved in a direction away from the plate material that is fixed.

4. The plate-material abutting device according to claim 1, wherein each of the first abutting mechanism and the second abutting mechanism includes a whole-body moving mechanism that moves the whole body of the abutting mechanism, the whole-body moving mechanisms moving respectively independently.

5. The plate-material abutting device according to claim 1, wherein at least one of the first abutting mechanism and the second abutting mechanism includes an upper jig and a lower jig that sandwich the plate materials, the upper jig being coupled with the lower jig.

6. A plate-material abutting device for joining a first plate material and a second plate material in a state in which the plate materials are abutted with each other,
the first plate material including a first abutted portion and a second abutted portion that is a portion different from the first abutted portion,
the second plate material including a third abutted portion corresponding with the first abutted portion and a fourth abutted portion corresponding with the second abutted portion,
wherein one position where the first abutted portion and the third abutted portion contact and another position where the second abutted portion and the fourth abutted portion contact are different geometrically from each other in an approach-and-separation direction and spaced from each other in a lateral direction perpendicular to the approach-and-separation direction,
and the plate-material abutting device comprising: a first abutting mechanism that abuts the first abutted portion with the third abutted portion; and
a second abutting mechanism that abuts the second abutted portion with the fourth abutted portion, the second abutting mechanism moving independently of the first abutting mechanism,
wherein the first abutting mechanism and the second abutting mechanism are juxtaposed each other in the lateral direction.

* * * * *